Sept. 20, 1927. 1,642,721
H. L. BROOKE
CENTRIFUGAL CLUTCH
Original Filed Feb. 20, 1925 2 Sheets-Sheet 2

H.L. Brooke
inventor
By: Marks & Clerk
Attys

Patented Sept. 20, 1927.

1,642,721

UNITED STATES PATENT OFFICE.

HOLMAN LINNELL BROOKE, OF BRADFORD, ENGLAND.

CENTRIFUGAL CLUTCH.

Original application filed February 20, 1925, Serial No. 10,673, and in Great Britain March 19, 1924. Divided and this application filed May 4, 1926. Serial No. 106,747.

This invention has reference generally to that class of invention known as clutches and more particularly relates to an improved centrifugal clutch.

The invention is a divisional of my co-pending application filed Feb. 20, 1925, Serial No. 10,673 and although for the purpose of illustration the clutch is shown in this case as applied to a transmission gearing it is to be understood that with slight modifications the same may be applied in other connections.

It is the primary aim and object of this invention to provide a simplified and improved construction of a centrifugal clutch.

Briefly the invention may be said to consist of a rotatable driving member having masses or weighted bodies therein which present a wave-like peripheral surface for coacting with antifriction means such as rollers interposed between said masses or weighted bodies and the driven member.

Other objects as well as the nature, characteristic features and scope of the invention will be more readily understood from the following description taken in connection with the accompanying drawings and pointed out in the claims.

The invention is clearly illustrated in the accompanying drawings, in which:—

Figure 1:
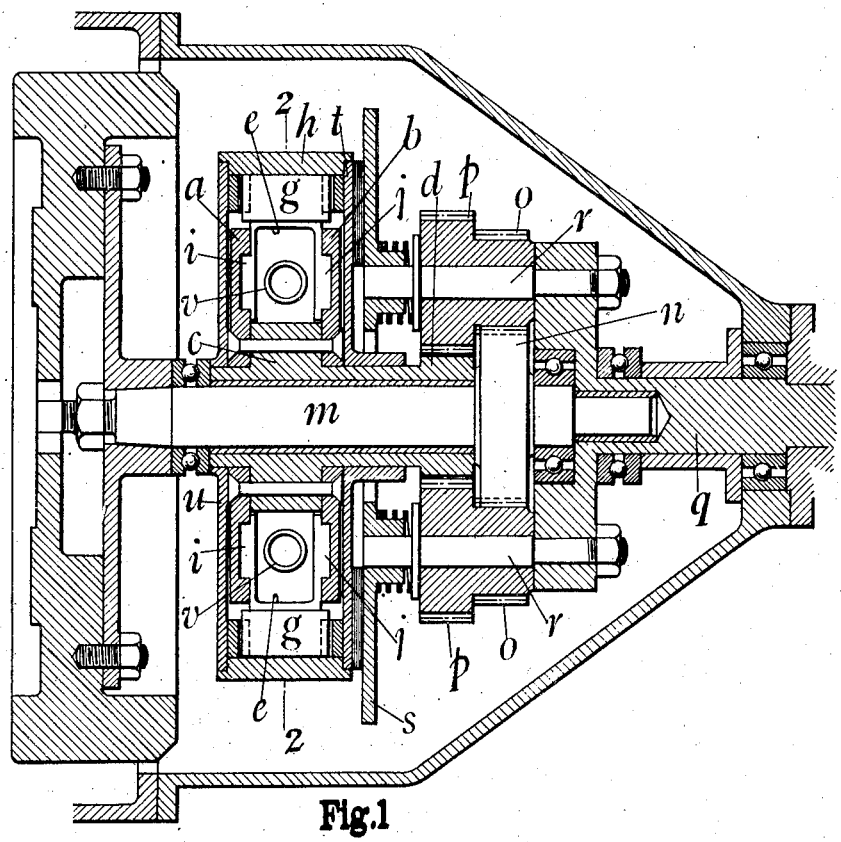
Figure 2:
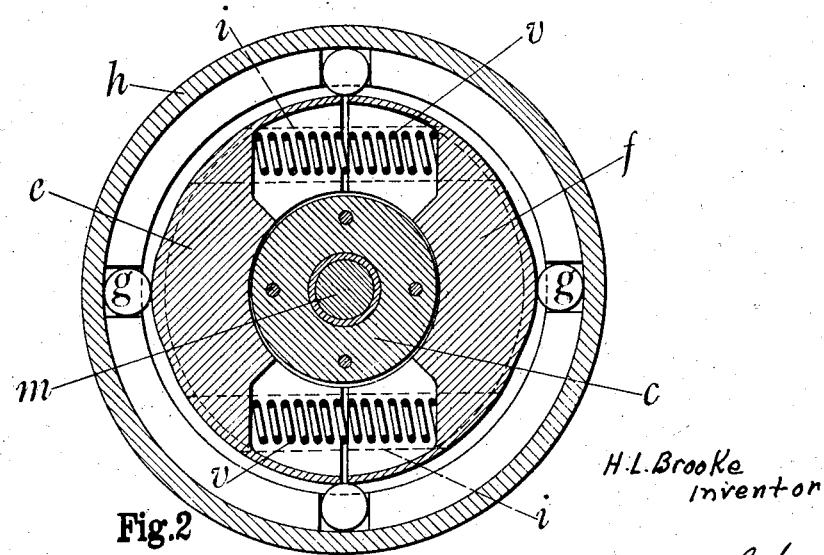
Figure 4:
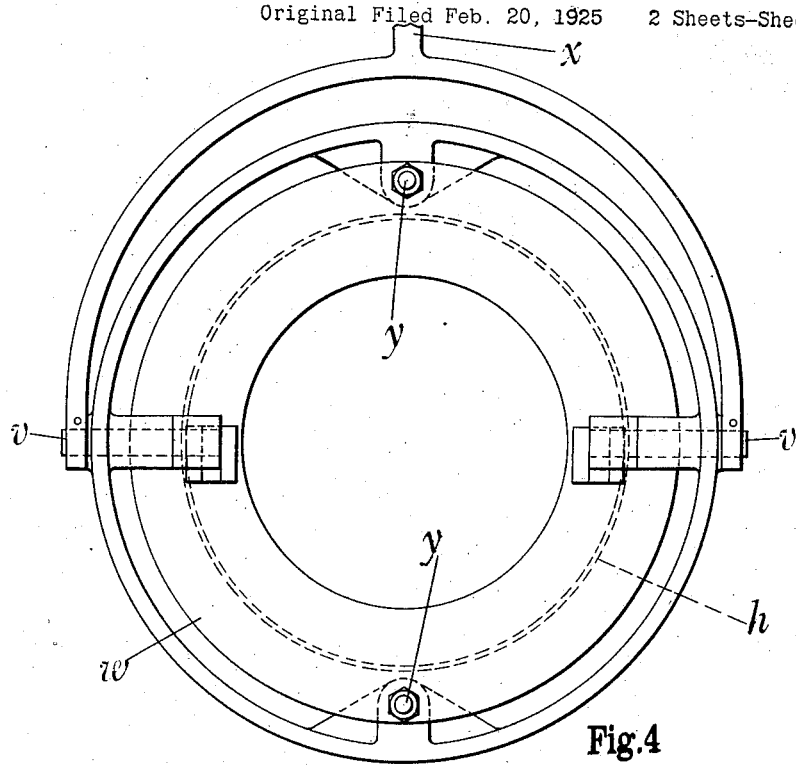
Figure 3:
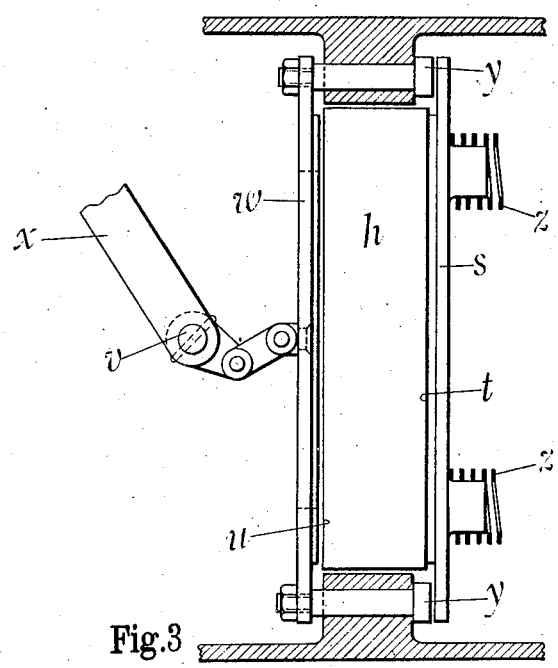

Fig. 1 is a sectional elevation of an improved clutch device applied to an infinitely variable gear, Fig. 2 is a sectional elevation on the line 2—2 of Fig. 1, and Figs. 3 and 4 are views at right angles to one another of an operating mechanism for association with the clutch device whereby the gear may be placed in neutral or reverse.

Similar characters of reference are employed in all of the above described views to indicate corresponding parts.

I provide between rings or discs $a$, $b$, secured to the hollow driving shaft $c$ with the gear wheel $d$ thereon, bodies $e$, $f$, which may be of the sectional shape shown in Figure 2, and which present practically a continuous peripheral surface to rollers $g$ interposed between themselves and the driven member $h$. The said bodies have their mass concentrated so that the action of centrifugal force will tend to move them in radial directions opposed to one another. The rings or discs $a$ and $b$ have slots or grooves $i$, $j$, therein, into which parts of the weighted bodies $e$ $f$ extend so as to act as key ensuring the rotation of the weights with the discs $a$, $b$, whilst allowing radial movement of the weights under centrifugal force and as hereinafter described.

Each weighted body $e$ $f$ has a peripheral crest or wave at a point on a radial center coincident with the direction of radial movement of the weight under centrifugal force. Such crest or wave projects an amount which does not exceed the versed sine of half the angle subtended by the wave, the versed sine being taken about the center of gravity of the weight. It will be seen that as the waves make contact with the rollers $g$, the weights $e$ and $f$ will be forced inwards against the action of centrifugal force. The springs $v$ tend to hold the weights $e$ and $f$ in their extended positions.

The driving member $m$ has a gear wheel $n$ thereon. Such wheel meshes with the planet wheels $o$ of an epicyclic or differential gear; the other planet wheels $p$ mesh with the sun wheel $d$ before referred to which is connected to the infinitely variable gear construction previously described. The driven shaft $q$ is connected to the spindles $r$ carrying the planet pinions $o$, $p$. The ends of the spindles $r$ form a driving means for the clutch plate $s$ which is adapted to be brought into engagement with the side member $t$ which along with the side member $u$ support and are secured to the driven ring $h$ of the infinitely variable gear unit.

In action, the weighted bodies $e$ and $f$ press against the rollers $g$ under the influence of centrifugal force and, by reason of the wave-like formation of the periphery of the weights $e$ and $f$, rotary impulses are imparted to the driven member $h$ when the crests of the waves are in contact with the rollers $g$. When the speed of $h$ is lower than the speed of $e$ and $f$, reciprocating radial movements are given to the latter. As, ignoring friction, energy is not lost in revolving the weighted bodies $e$ and $f$ and, further, as energy absorbed by their inward radial movements is returned by their outward radial movements, their rotational speed will generate the requisite centrifugal force in them to ensure rotary impulses sufficient to overcome the resistance in $h$, and the speed of $h$ will be such that the energy absorbed in the driven side will equal the energy transmitted from the driving side. The rotation of $h$ is imparted to shaft $q$ through clutch plate $s$ and pins $r$. If clutch plate $s$ is released from plate $t$ a neutral position is obtained in which the planet wheels $o$ and $p$ revolve idly on the pins $r$ and no power can be transmitted from $m$ to $q$, but if in addition to the release of clutch plate $s$, the member $h$ be locked against rotation, the impulses generated as the crests of the waves on the weighted bodies $e$ and $f$ make contact with the rollers $g$, create equal reaction impulses in the pins $r$ and thereby rotate the said pins $r$ and therefore the shaft $q$ about the common centre of rotation in a reverse direction to the rotation of the bodies $e$ and $f$.

The differential gear may be of any suitable proportions, but preferably it is so proportioned that variations of speed of the driven element $q$ cause inverse variations of speed of the shaft $c$. Thus, if the speed of $q$ decreases, the speed of $c$ increases independently of the speed of the shaft $m$. With this arrangement, the speed of the weighted bodies $e$ and $f$ is a function of the speeds of both the driving side and the driven side, and thus for a constant resistance in $q$ a constant speed of $e$ and $f$ can be obtained in conjunction with variations of the speed of $m$ equivalent to variations of the speed of $q$ from a maximum to zero.

In the arrangement shown in Figures 3 and 4, the lever $x$ fulcrumed at $v$ is adapted to operate the clutch plates $w$ and $s$. The first portion of the downward movement of the lever $x$ presses the plate $w$ towards the side $u$ (Figure 1) of the infinitely variable gear and the pushers $y$ against the plate $s$. The latter is removed from engagement with the side $t$ of the infinitely variable gear before the clutch plate $w$ engages the side $u$. Further movement of the lever $x$ causes the plate $w$ to engage the side $u$ to bring the part $h$ of the gear to rest whilst still holding the plate $s$ clear of the side $t$ of the gear $z$ indicate the springs of the clutch plate $s$.

It will be understood that when the weighted bodies are being rotated and their crests are moving between the rollers $g$, no resistance is offered to such rotation nor to the outward movement of the weights to their full extent under centrifugal action. During such periods of rotation therefore, the weights accumulate energy enabling the driven member to deliver a higher torque, than is transmitted by the driving member. The speed of the driven member is so related to its torque that the energy absorbed by the driven system will equal the energy transmitted by the driving system or prime mover.

Having thus fully described the invention what is claimed as new and desired to be secured by Letters Patent is:—

1. A centrifugal clutch of the character described, comprising a rotating driving member, weighted bodies mounted thereon and presenting a wave-like peripheral surface, a driven member, and rollers interposed between the weighted bodies and the driven member so that movement of the driving member relative to the driven member results in radial movement of said weighted bodies against the action of centrifugal force, substantially as and for the purposes set forth.

2. A centrifugal clutch of the character described including a driving member embodying two side plates, a pair of semi-cylindrical weighted bodies slidably carried between the plates in such manner that they rotate therewith and move under centrifugal action, the peripheral surface of each body having a wave-like portion thereon, an annular driven member, and a plurality of rollers interposed between the periphery of the weighted bodies and the driven member.

In testimony whereof I affix my signature.

HOLMAN LINNELL BROOKE.